(12) United States Patent
Yamada et al.

(10) Patent No.: US 9,442,653 B2
(45) Date of Patent: Sep. 13, 2016

(54) DISPLAY CONTROL SYSTEM, POINTER, AND DISPLAY PANEL

(71) Applicant: Panasonic Corporation, Osaka (JP)

(72) Inventors: Kazuhiro Yamada, Osaka (JP); Yasuhiro Tanaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 361 days.

(21) Appl. No.: 14/049,009

(22) Filed: Oct. 8, 2013

(65) Prior Publication Data

US 2014/0035880 A1 Feb. 6, 2014

Related U.S. Application Data

(63) Continuation of application No. PCT/JP2013/002709, filed on Apr. 22, 2013.

(30) Foreign Application Priority Data

Apr. 26, 2012 (JP) ................................. 2012-101735

(51) Int. Cl.
| | | |
|---|---|---|
| *G06F 3/0354* | (2013.01) | |
| *G01N 21/956* | (2006.01) | |
| *G07C 13/00* | (2006.01) | |
| *G06F 17/30* | (2006.01) | |
| *H04N 9/083* | (2006.01) | |
| *G06F 3/03* | (2006.01) | |

(Continued)

(52) U.S. Cl.
CPC ........... *G06F 3/04883* (2013.01); *G06F 3/042* (2013.01)

(58) Field of Classification Search
CPC .......................... G06F 3/0317; G06F 3/03545
USPC ......... 345/158, 179, 676; 359/642; 382/237; 434/408
See application file for complete search history.

(56) References Cited

U.S. PATENT DOCUMENTS

| | | | | |
|---|---|---|---|---|
| 3,908,193 A | * | 9/1975 | Macovski | H04N 9/083 348/292 |
| 6,962,450 B2 | * | 11/2005 | Brouhon | G06F 3/03545 178/18.01 |
| 7,134,606 B2 | * | 11/2006 | Chou | G07C 13/00 235/472.03 |

(Continued)

FOREIGN PATENT DOCUMENTS

| | | |
|---|---|---|
| JP | 7-141104 A | 6/1995 |
| JP | 2002-196875 A | 7/2002 |

(Continued)

OTHER PUBLICATIONS

International Search Report for PCT/JP2013/002709 mailed Jun. 18, 2013, 2 pages.

*Primary Examiner* — Lin Li
(74) *Attorney, Agent, or Firm* — McDermott Will & Emery LLP

(57) ABSTRACT

The display control system performs display control according to a position indicated by a pointer on a display panel. The display panel includes pixel regions defined by a black matrix, and a positional information pattern showing a plan position is formed in the display panel. The pointer includes a reader configured to capture an image which is at the indicated position and includes the positional information pattern. The optical system of the reader is formed to have a low resolution so that the black matrix of the display panel is removed.

7 Claims, 11 Drawing Sheets

(51) Int. Cl.
*G06F 3/0488* (2013.01)
*G06F 3/042* (2006.01)

(56) References Cited

U.S. PATENT DOCUMENTS

| | | | |
|---|---|---|---|
| 7,331,530 B2* | 2/2008 | Mackenzie | G06F 17/30876 235/454 |
| 7,528,848 B2* | 5/2009 | Xu | G06F 3/03545 345/179 |
| 2002/0046887 A1 | 4/2002 | Yanagisawa et al. | |
| 2003/0029919 A1 | 2/2003 | Lynggaard et al. | |
| 2004/0160430 A1* | 8/2004 | Tokunaga | G06F 3/03545 345/179 |
| 2006/0097997 A1* | 5/2006 | Borgaonkar | G06F 3/03545 345/179 |
| 2006/0132617 A1* | 6/2006 | Ohta | 348/220.1 |
| 2007/0003150 A1* | 1/2007 | Xu | G06F 3/03545 382/237 |
| 2007/0058868 A1* | 3/2007 | Seino | G06F 3/0317 382/187 |
| 2011/0011940 A1 | 1/2011 | Yoshida | |
| 2012/0069054 A1* | 3/2012 | MacDonald | G06F 3/03545 345/676 |
| 2013/0148115 A1* | 6/2013 | Berlatzky | G01N 21/956 356/237.5 |

FOREIGN PATENT DOCUMENTS

| | | |
|---|---|---|
| JP | 2006-127081 A | 5/2006 |
| JP | 2007-226577 A | 9/2007 |
| JP | 2009-134706 A | 6/2009 |
| JP | 4342936 B2 | 7/2009 |
| JP | 4774716 B2 | 7/2011 |

* cited by examiner

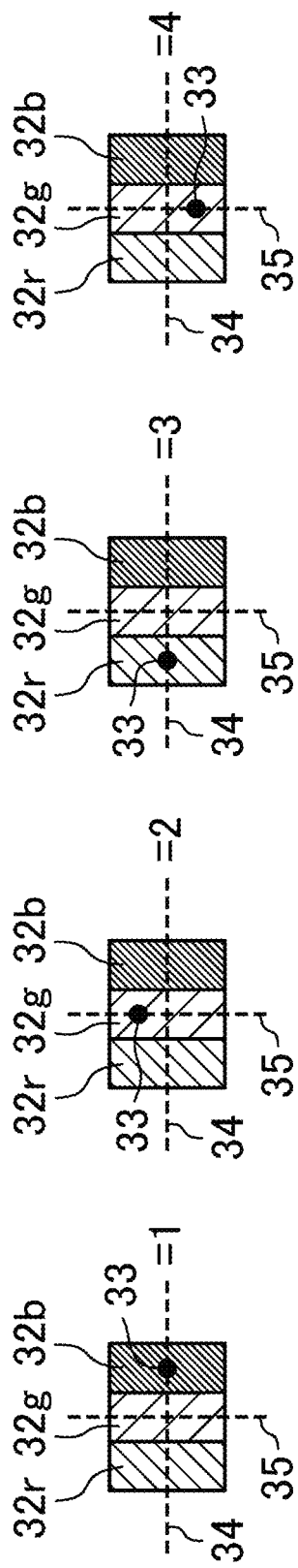

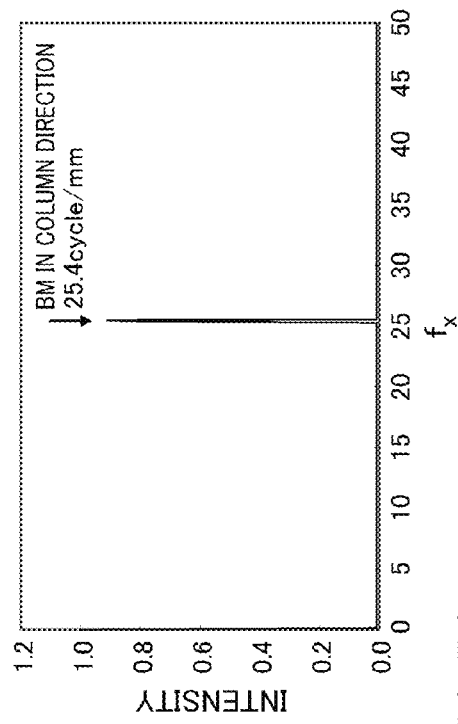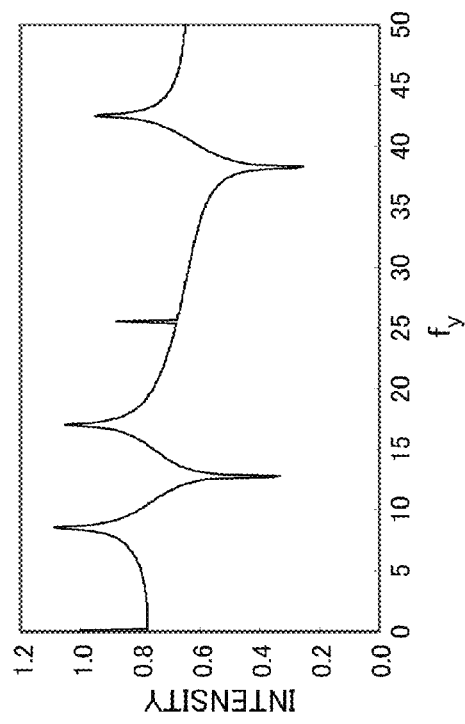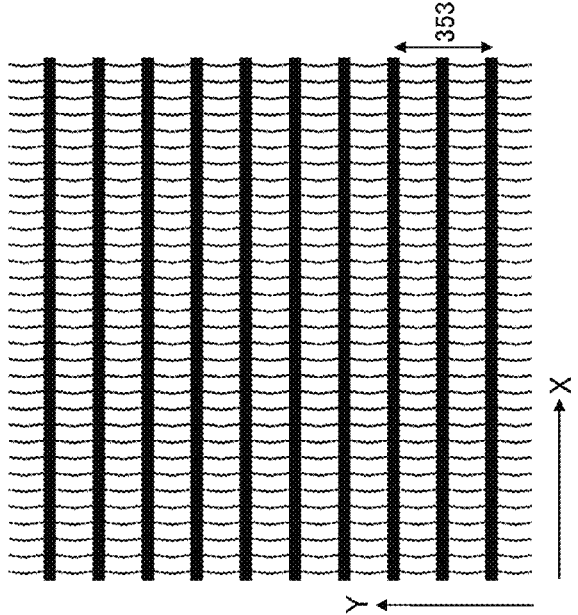

DISPLAY CONTROL SYSTEM, POINTER, AND DISPLAY PANEL

CROSS-REFERENCE TO RELATED APPLICATIONS

This is a continuation of International Application No. PCT/JP2013/002709 filed on Apr. 22, 2013, which claims priority to Japanese Patent Application No. 2012-101735 filed on Apr. 26, 2012. The entire disclosures of these applications are incorporated by reference herein.

BACKGROUND

The present disclosure relates to display control systems enabling handwriting input on display surfaces of digital displays.

Japanese Patent Publication No. 2007-226577 describes a technique in which characters, or the like, is written on a piece of paper with a pen, the information written on the paper is computerized, and the computerized information is transmitted to a server and/or a terminal.

SUMMARY

The present disclosure provides a display control system enabling handwriting input with quick response on a display surface of a display device.

A display control system of the present disclosure includes: a display device including a display area; and a pointer configured to indicate a position on the display area, wherein the display control system performs display control according to the position indicated by the pointer, the display area of the display device includes pixel regions defined by a black matrix, and a positional information pattern showing a plan position in the display area, the pointer includes a pointing section configured to indicate a position on the display area, and a reader configured to capture an image which is at the position indicated by the pointing section and includes the positional information pattern, and a resolution of an optical system in the reader is lower than at least one of a spatial frequency in a column direction of the black matrix or a spatial frequency in a row direction of the black matrix.

The display control system of the present disclosure significantly saves time required for an image recognition process for identifying positions, thereby enabling handwriting input with quick response.

BRIEF DESCRIPTION OF THE DRAWINGS

FIGS. 6A-6D are views illustrating examples of dot arrangements corresponding to respective digits.

FIGS. 7A-7C are views illustrating examples of the frequency characteristics of a black matrix.

DETAILED DESCRIPTION

In recent years, systems enabling handwriting input have been being developed, where characters, or the like, are written on a display surface of a display device with a writing instrument such as a stylus, the trace of the writing instrument being directly displayed on the display surface. Such systems are in the process of development. In particular, in terms of high-resolution handwriting input, such systems are still susceptible to development.

Examples of such display control systems include a configuration in which a positional information pattern showing a plan position is formed in a display area, and the positional information pattern is optically read by a pointer, thereby detecting an indicated position to perform trace display or the like.

A display control system in which an optical reading process as described above is used will have the following problems. For example, a display area of a liquid crystal display panel includes a black matrix for defining pixel regions. Thus, when the liquid crystal display panel is used in the display control system as described above, the image of the black matrix may hinder a positional information pattern from being optically read. It is, of course, possible to remove the black matrix from an image captured by a pointer through image processing and a calculation process, but these processes for the removal take time, so that response time until trace display or the like is increased.

An embodiment is described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventors provide the following description and the attached drawings to enable those skilled in the art to fully understand the present disclosure. Thus, the description and the drawings are not intended to limit the scope of the subject matter defined in the claims.

1. Outline of Display Control System

Figure 1:
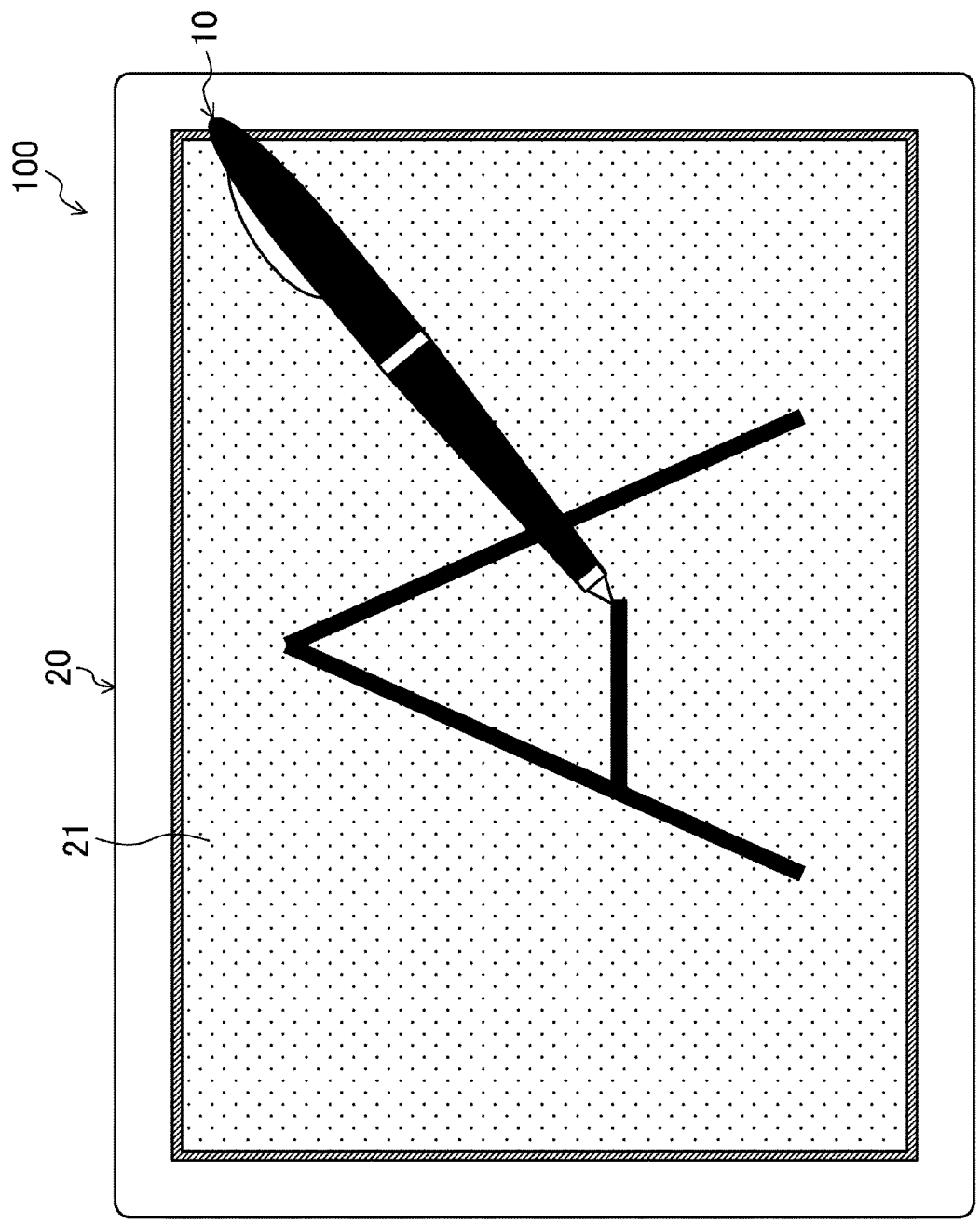
FIG. 1 is a view schematically illustrating a display control system according to an embodiment.

FIG. 1 is a view schematically illustrating the external appearance of a display control system 100 according to an embodiment. The display control system 100 includes an optical digital pen (hereinafter simply referred to as "digital pen") 10 as a pointer, and a display device 20. As described in detail later, the display device 20 is, for example, a liquid crystal display, and can display various objects on its display area 21. Moreover, in the display area 21, dot patterns as positional information patterns showing plan positions in the display area 21 are formed. The digital pen 10 optically reads the dot pattern to detect positional information of a specified position, and transmits the positional information to the display device 20. The display device 20 receives the positional information as an input, and performs various processes on the positional information. That is, the digital pen 10 serves as a reader, and also serves as a device for inputting data to the display control system 100.

For example, the display device 20 continuously displays, in accordance with the movement of the digital pen 10, points at specified positions in the display area 21. In this way, the display device 20 can display a trace left by the tip of the digital pen 10. That is, the digital pen 10 can be used to write characters, drawings, etc. in the display area 21. Alternatively, the display device 20 continuously erases, in accordance with the movement of the digital pen 10, displayed points at specified positions in the display area 21. In this way, the display device 20 can erase the displayed points at the positions corresponding to a trace left by the tip of the digital pen 10. That is, the digital pen 10 can be used as an eraser. Alternatively, the display device 20 displays a specified position in the display area 21, so that the digital pen 10 can be used as an input device such as a mouse. As described above, in the display control system 100, the digital pen 10 is moved on the display area 21 of the display device 20 to input the position of the digital pen 10 to the display device 20, and according to the input, the display device 20 changes displayed contents.

2. Configuration of Display Device

Figure 2:
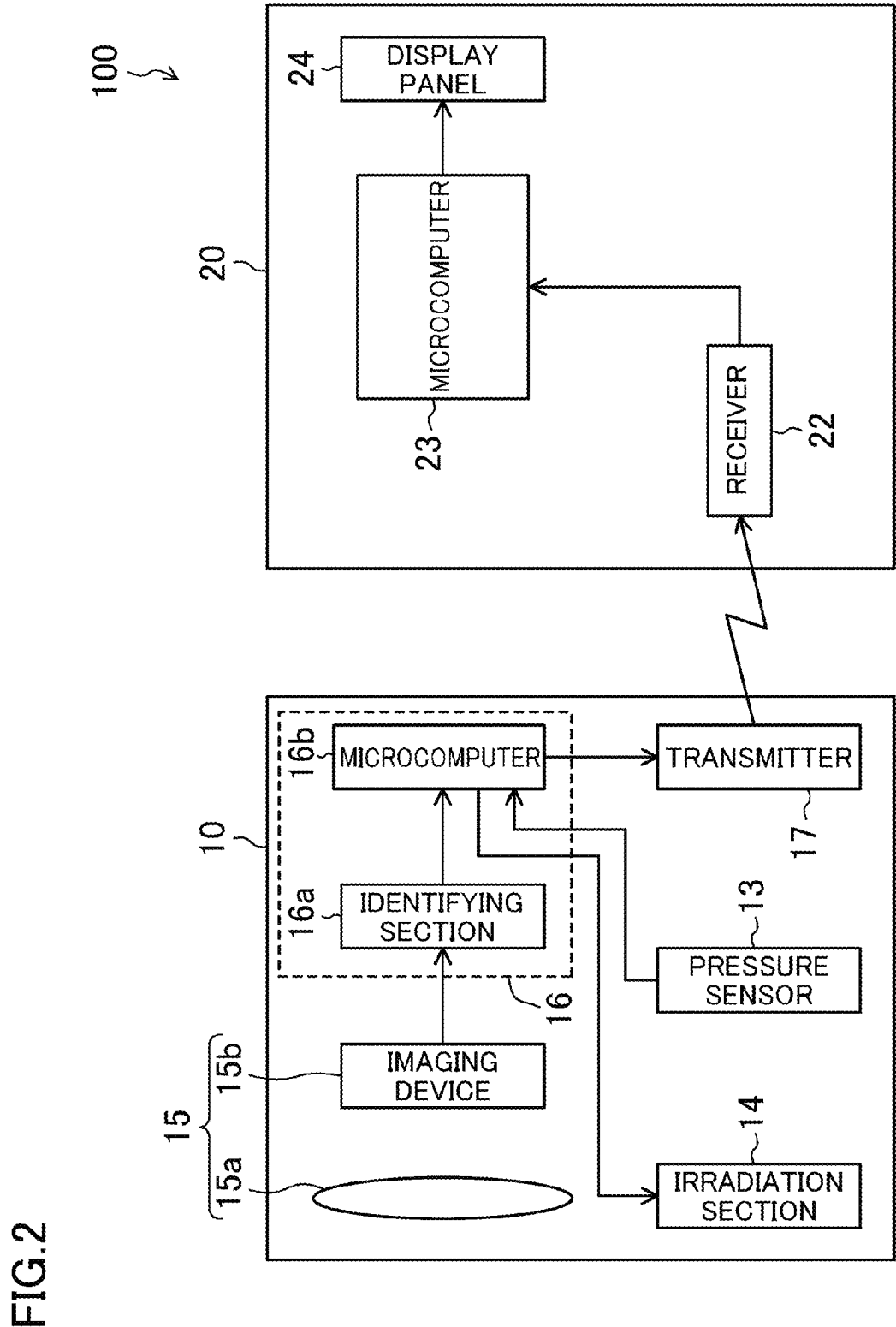
FIG. 2 is a block diagram illustrating the display control system of the embodiment.

The display device 20 will be described below. FIG. 2 is a block diagram schematically illustrating the configuration of the display control system 100.

The display device 20 includes a receiver 22 configured to receive an external signal, a microcomputer 23 (which is included in the display device 20, and thus, hereinafter referred to as a display-side microcomputer 23) configured to control the entire display device 20, and a display panel 24 configured to display images. The display panel 24 of the present embodiment is a liquid crystal panel.

The receiver 22 receives a signal transmitted from the digital pen 10, which will be described in detail later. The signal received by the receiver 22 is sent to the display-side microcomputer 23.

The display-side microcomputer 23 includes a CPU, a memory, etc., and a program for operating the CPU is also implemented on the display-side microcomputer 23. The display-side microcomputer 23 is an example of a controller. For example, the display-side microcomputer 23 controls the display panel 24 based on the signal transmitted from the digital pen 10, thereby changing contents to be displayed in the display area 21.

Figure 3:
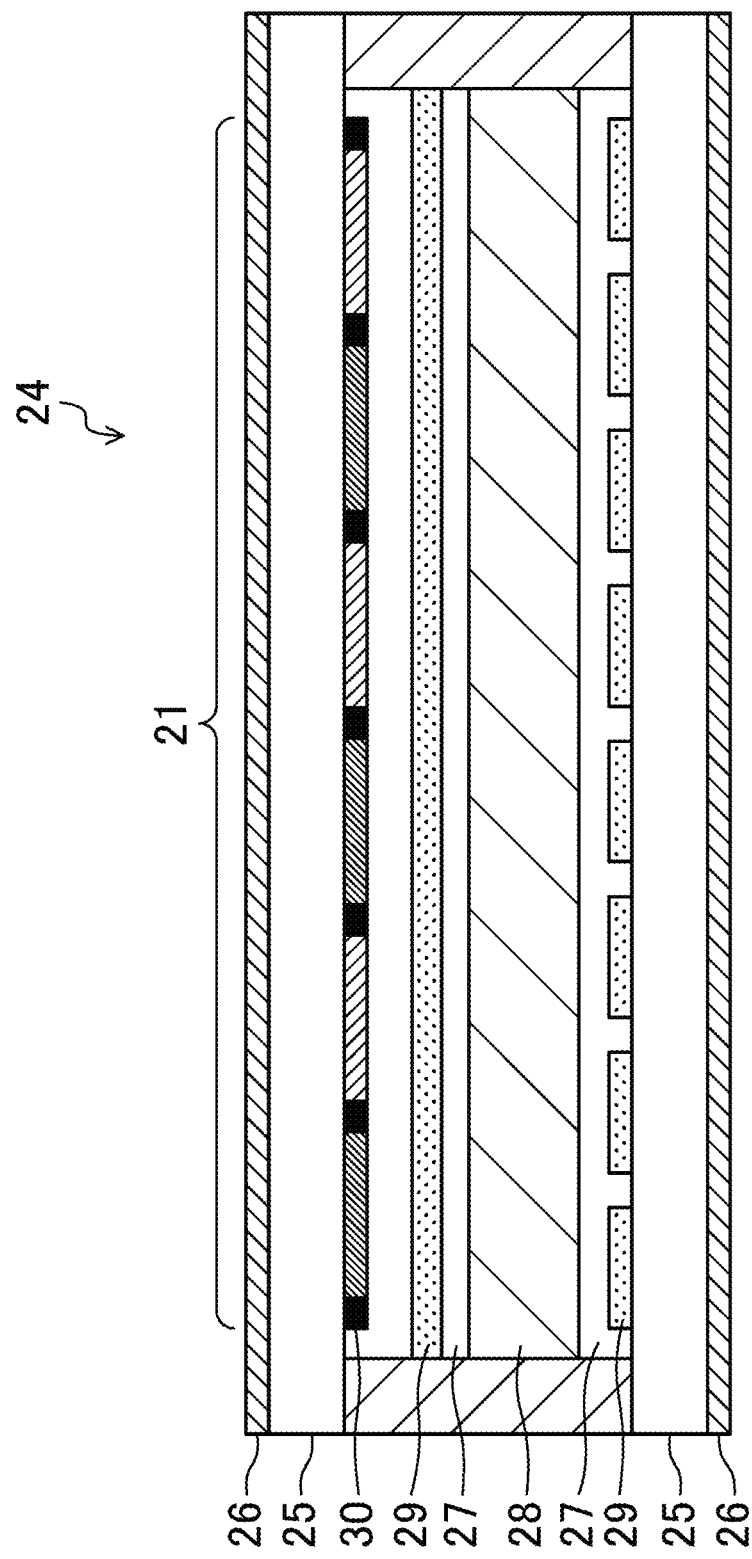
FIG. 3 is a cross-sectional view schematically illustrating a display panel.

FIG. 3 is a cross-sectional view schematically illustrating the display panel 24. The basic configuration of the display panel 24 is similar to those of generally used liquid crystal panels. Specifically, the display panel 24 includes a pair of glass substrates 25, polarizing filters 26 each provided on an outer surface of the glass substrate 25, a pair of alignment layers 27 provided between the pair of glass substrates 25, a liquid crystal layer 28 provided between the pair of alignment layers 27, transparent electrodes 29 each provided on the alignment layer 27, and a color filter 30 provided between the glass substrate 25 on a display side and the transparent electrode 29. Various images are displayed in the display area 21. As described in detail later, the dot patterns are provided in the color filter 30. The dot pattern is an example of a positional information pattern.

3. Configuration of Digital Pen

Figure 4:
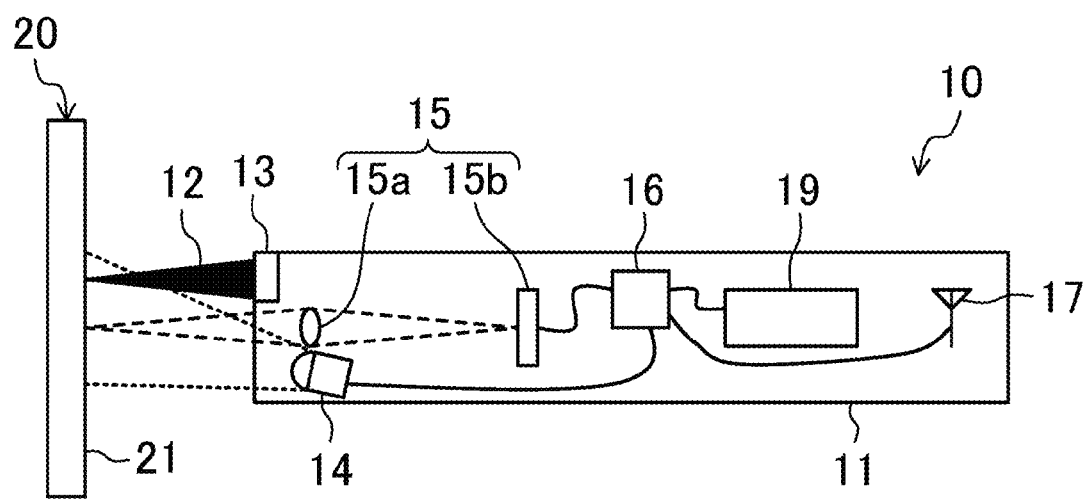
FIG. 4 is a cross-sectional view schematically illustrating a digital pen.

Next, the detailed configuration of the digital pen 10 will be described. FIG. 4 is a cross-sectional view schematically illustrating the configuration of the digital pen 10.

The digital pen 10 includes a cylindrical body 11, a nib 12 attached to the tip of the body 11, a pressure sensor 13 configured to detect pressure applied to the nib 12, an irradiation section 14 configured to output infrared light, a reader 15 configured to read incident infrared light, a controller 16 configured to control the digital pen 10, a transmitter 17 configured to output a signal to the outside, and a power supply 19 configured to supply electric power to each member of the digital pen 10.

The body 11 is made of a cylinder similar to those of generally used pens. The nib 12 has a tapered shape, and the tip of the nib 12 is rounded so that the display surface 21 is not scratched. The nib 12 preferably has such a shape that a user easily recognizes an image displayed on the display surface 21.

The pressure sensor 13 is built in the body 11, and connected to the base end portion of the nib 12. The pressure sensor 13 detects pressure applied to the nib 12, and transmits the result of the detection to the controller 16. Specifically, the pressure sensor 13 detects pressure applied to the nib 12 when a user writes a character, or the like, on the display surface 21 with the digital pen 10. That is, the pressure sensor 13 is used to determine whether or not a user has intention to input a character or the like with the digital pen 10.

The irradiation section 14 is provided at a tip portion of the body 11 near the nib 12. The irradiation section 14 includes, for example, an infrared LED, and is configured to output infrared light from the tip of the body 11.

The reader 15 is provided at the tip portion of the body 11 near the nib 12. The reader 15 includes an objective lens 15a and an imaging device 15b. The objective lens 15a forms an image on the imaging device 15b from incident light. Since the objective lens 15a is provided at the tip portion of the body 11, infrared light output from the irradiation section 14 and reflected at the display device 20 enters the objective lens 15a. The imaging device 15b is provided on the optical axis of the objective lens 15a. The imaging device 15b converts the optical image formed on its imaging plane to an electrical signal, and outputs the electrical signal to the controller 16. The imaging device 15b includes, for example, a CCD image sensor or a CMOS image sensor. As described in detail later, the dot patterns are made of a material absorbing infrared light, and thus the infrared light is not reflected at the dot patterns. As a result, an optical image in which the dot patterns appear black is captured by the imaging device 15b.

As illustrated in FIG. 2, the controller 16 includes an identifying section 16a and a microcomputer 16b (hereinafter referred to as a pen-side microcomputer 16b). The identifying section 16a identifies the positional information of the digital pen 10 on the display surface 21 based on an image signal from the reader 15. Specifically, the identifying section 16a obtains a dot pattern from the image signal obtained by the reader 15, and based on the dot pattern, the identifying section 16a identifies the position of the nib 12 on the display surface 21. The information about the position of the nib 12 identified by the identifying section 16a is sent to the pen-side microcomputer 16b. The pen-side microcomputer 16b controls the entire digital pen 10. The pen-side microcomputer 16b includes a CPU, a memory, etc., and a program for operating the CPU is also implemented on the pen-side microcomputer 16b.

The transmitter 17 transmits the signal to the outside. Specifically, the transmitter 17 wirelessly transmits the positional information identified by the identifying section 16a to the outside. The transmitter 17 performs near field wireless communication with the receiver 22 of the display device 20. The transmitter 17 is provided at an end portion of the body 11 opposite to the nib 12.

4. Detailed Structure of Color Filter

Figure 5:
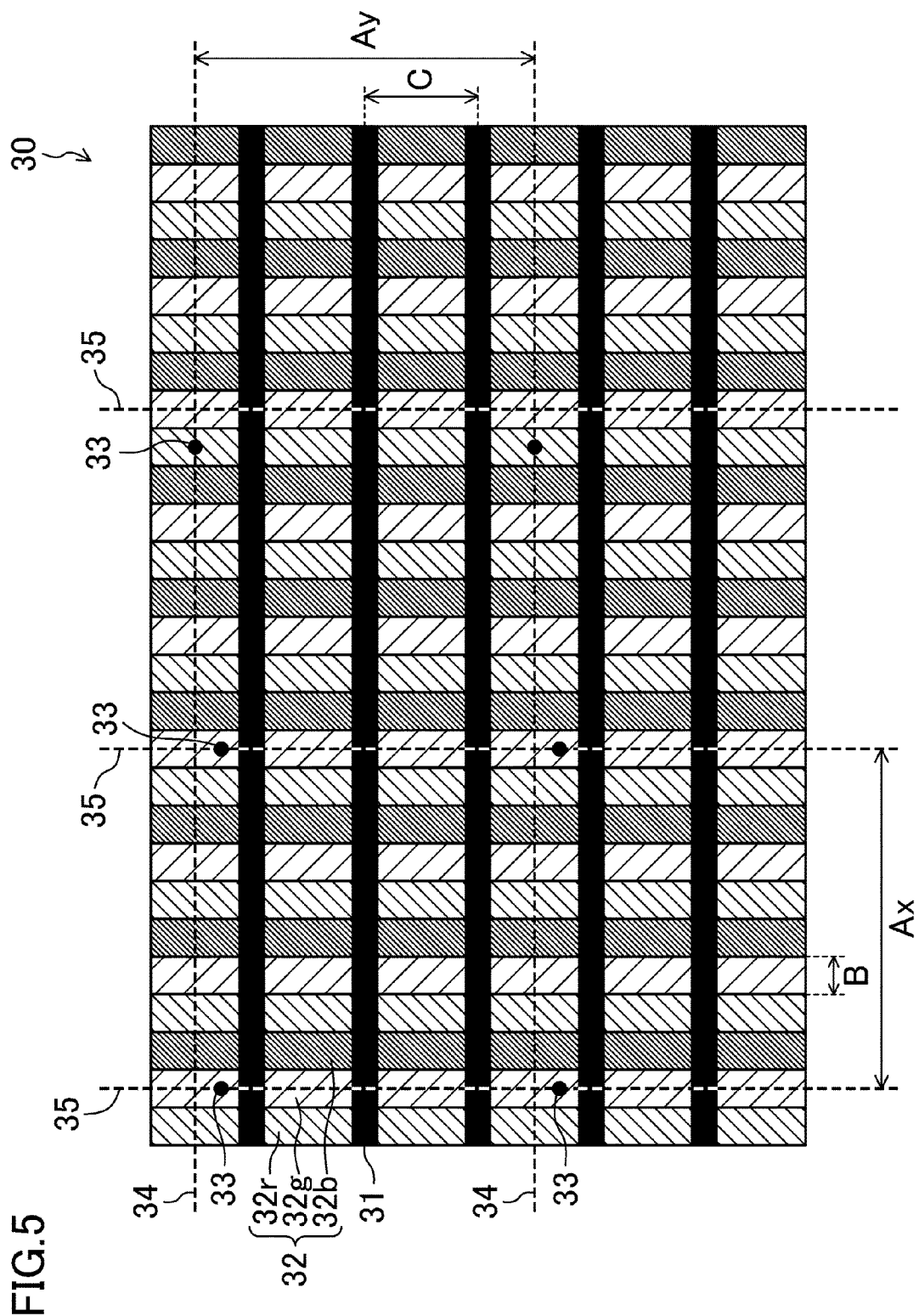
FIG. 5 is a plan view of a color filter.

Subsequently, the detailed structure of the color filter 30 will be described. FIG. 5 is a plan view of the color filter 30.

The color filter 30 includes a black matrix 31, a plurality of pixel regions 32 defined by the black matrix 31 and allowing transmission of light in certain colors, and dots 33 provided in the pixel regions 32. Each pixel region 32 includes a red pixel region 32r allowing transmission of red (R) light, a green pixel region 32g allowing transmission of green (G) light, and a blue pixel region 32b allowing transmission of blue (B) light. Each pixel region 32 corresponds to a subpixel of the display panel 24. Note that, when the colors of light to be transmitted are not distinguished from one another, the term "pixel region(s) 32" is simply used. The black matrix 31 includes column lines extending in the longitudinal direction of the pixel regions 32 and row lines extending in the lateral direction of the pixel regions 32, and is formed in a lattice shape. The row lines are larger in width than the column lines. The black matrix 31 and the dots 33 are made of a material containing carbon black as a main component. The dots 33 are formed in a solid circular shape. The dots 33 are provided not in all the pixel regions 32 but in some of the pixel regions 32. In the color filter 30, a collection of the dots 33 forms a dot pattern. Dot patterns differ from one another depending on positions in the color filter 30.

The dot pattern will be described in detail below.

First, first reference lines 34 and second reference lines 35 are defined on color filter 30. These first and second reference lines 34, 35 are virtual lines, but do not exist in reality. The first reference lines 34 are straight lines extending in the lateral direction of the pixel region 32. The first reference lines 34 are arranged in parallel at every two pixel regions 32 in the longitudinal direction of the pixel regions 32. Each first reference line 34 is located at the center in the longitudinal direction of the pixel region 32. The second reference lines 35 are straight lines extending in the longitudinal direction of the pixel region 32. The second reference lines 35 are provided on the green pixel regions 32g, and are arranged in parallel at every two green cells 32g in the lateral direction of the pixel regions 32. Each second reference line 35 is located at the center in the lateral direction of the green pixel region 32g. The first reference lines 34 and the second reference lines 35 define the lattice on the color filter 30.

Each dot 33 is arranged near the intersection point of the first reference line 34 and the second reference line 35. FIGS. 6A-6D are views illustrating arrangement patterns of the dots 33. The dot 33 is arranged at a position shifted from the intersection point in any one of four orthogonal directions (upward, downward, to the left, and to the right in FIGS. 5 and 6A-6D). Specifically, the arrangement of the dot 33 is any of the arrangements illustrated in FIGS. 6A-6D. In the arrangement of FIG. 6A, the dot 33 is arranged at a position shifted from the intersection point of the first reference line 34 and the second reference line 35 to the right on the first reference line 34. Here, the dot 33 is arranged on the blue pixel region 32b. The digitized representation of this arrangement is "1." In the arrangement of FIG. 6B, the dot 33 is arranged in a position shifted from the intersection point of the first reference line 34 and the second reference line 35 upward on the second reference line 35. Here, the dot 33 is arranged on the green pixel region 32g. The digitized representation of this arrangement is "2." In the arrangement of FIG. 6C, the dot 33 is arranged at a position shifted from the intersection point of the first reference line 34 and the second reference line 35 to the left on the first reference line 34. Here, the dot 33 is arranged on the red pixel region 32r. The digitized representation of this arrangement is "3." In the arrangement of FIG. 6D, the dot 33 is arranged at a position shifted from the intersection point of the first reference line 34 and the second reference line 35 downward on the second reference line 35. Here, the dot 33 is arranged on the green pixel region 32g. The digitized representation of this arrangement is "4."

One unit area includes 6×6 dots, and 36 dots 33 included in the unit area form one dot pattern. The arrangement of each of 36 dots 33 included in the unit area is any of "1"-"4" described above, so that a large number of dot patterns can be formed. Each unit area has a different dot pattern.

Information is added to each of the dot patterns. Specifically, each dot pattern shows the position coordinate of the unit area. That is, when the color filter 30 is divided into unit areas each including 6×6 dots, each dot pattern shows the position coordinate of the unit area. As a method for such patterning of the dot patterns and performing coordinate transformation, for example, a known method as disclosed in Japanese Patent Publication No. 2006-141067 may be used.

5. Characteristics and Operation of the Present Embodiment

The present embodiment is characterized by the optical system in the reader 15 of the digital pen 10. That is, the optical system in the reader 15 is set to have a low resolution so that a captured image from which the pattern of the black matrix has been removed in advance is obtained. The resolution of the optical system corresponds to an inverse number of resolving power obtained from the numerical aperture NA or the F number of a lens and the wavelength $\lambda$ of light. When the value of the resolving power is small, the resolution is high, and when the value of the resolving power is large, the resolution is low. For example, in the configuration of FIG. 4, a low-resolution lens is used as the objective lens 15a. In this configuration, image processing for removing the pattern of the black matrix from the captured image including dot patterns is no longer necessary, and thus time required for an image recognition process for identifying the position is significantly reduced. Thus, response to the movement of the digital pen 10 is significantly improved. That is, the present embodiment uses that a low-resolution lens has the same effect as spatial frequency filtering in image processing.

Figure 8B:
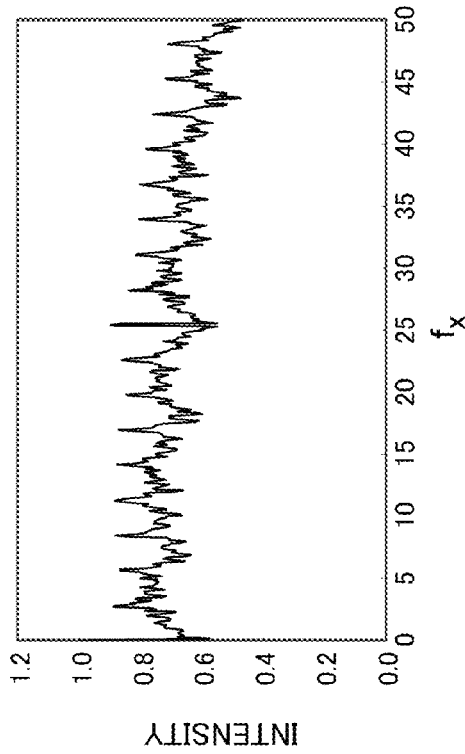
FIGS. 8A-8C are views illustrating examples of the frequency characteristics of the black matrix provided with dot patterns.
Figure 8C:
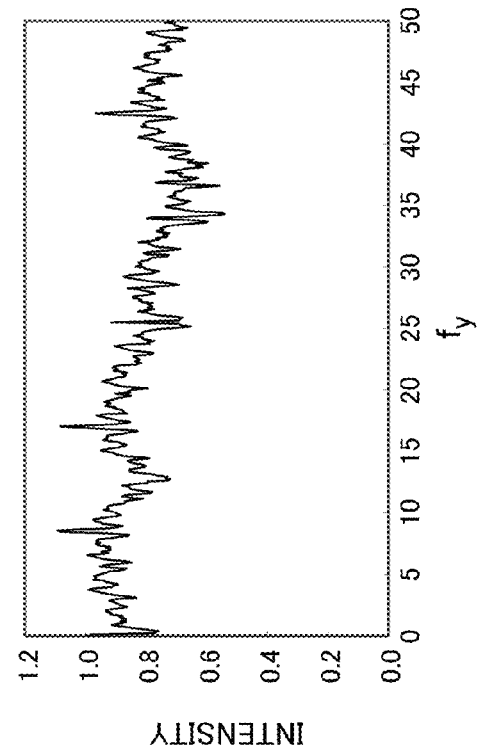
Figure 8A:
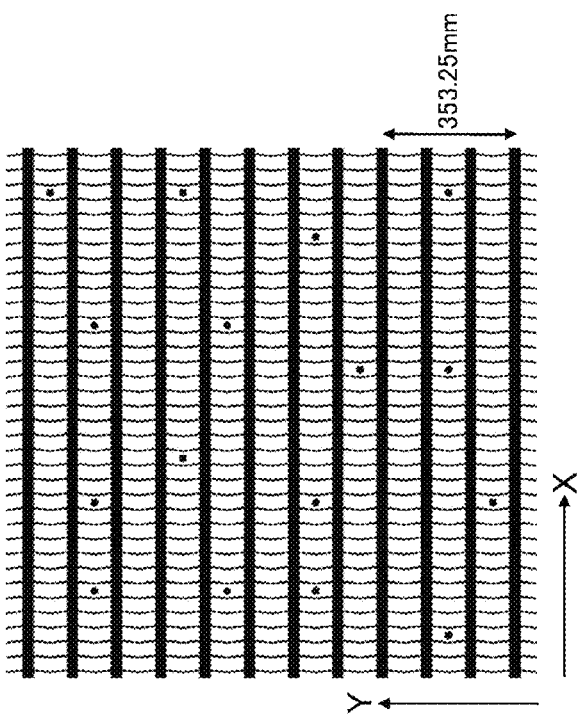

FIGS. 7A-7C illustrate an example of frequency characteristics of the black matrix without dot patterns. FIGS. 8A-8C illustrate an example of frequency characteristics when a dot patterns are provided in the black matrix of FIGS. 7A-7C. Reference symbol fx denotes the frequency (cycle/mm) in the X direction, and reference symbol fy denotes the frequency (cycle/mm) in the Y direction. In FIGS. 7A-7C, the frequency characteristic in the X direction (FIG. 7B) has a sharp peak at a frequency of 25.4 (cycle/ mm). The frequency characteristic in the Y direction (FIG. 7C) also has some peaks. The spatial frequency of the black matrix substantially corresponds to the inverse number of the pitch of the black matrix. For example, the sharp peak of the frequency characteristic in the X direction is due to the pitch of the black matrix in the column direction.

On the other hand, in FIGS. 8A-8C, both the frequency characteristic in the X direction (FIG. 8B) and the frequency characteristic in the Y direction (FIG. 8C) show the influence of peaks due to the black matrix, but the spatial frequencies are distributed over a wide range. Thus, when the resolution of the optical system in the reader 15 is set so that frequency peaks due to the black matrix can be reduced, it is possible to obtain a captured image from which the influence of the black matrix has been eliminated.

Figure 9C:
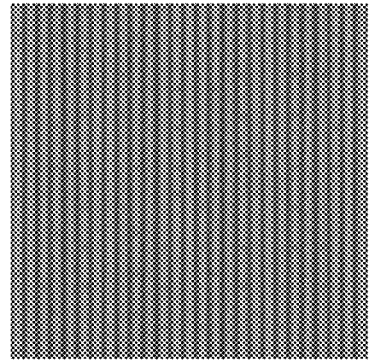
FIG. 9C is a view illustrating a captured image of FIG. 9B when the optical system of FIG. 9A is used.
Figure 9A:
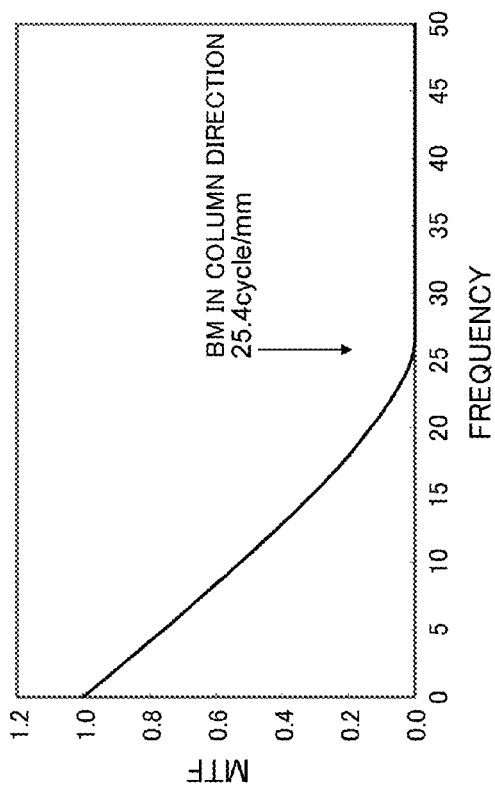
FIG. 9A is a view illustrating an example of the frequency characteristics of an optical system.
Figure 9B:
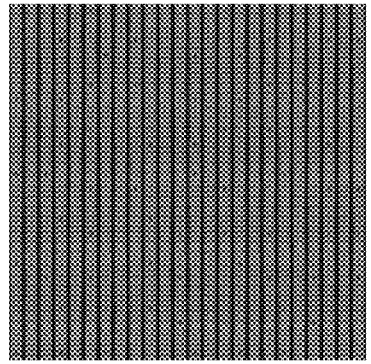
FIG. 9B is a view illustrating the black matrix provided with the dot patterns.

For example, as illustrated in FIG. 9A, the frequency characteristic of the optical system is set so that a frequency higher than or equal to a peak frequency of 25.4 (cycle/mm) due to the black matrix in the column direction is cut off. MTF means modulation transfer function. When dot patterns as illustrated in FIG. 9B are captured by using an optical system, such as that described above, a captured image as illustrated in FIG. 9C is obtained. From FIG. 9C, it can be seen that the black matrix in the column direction has been removed from the image.

Figure 10A:
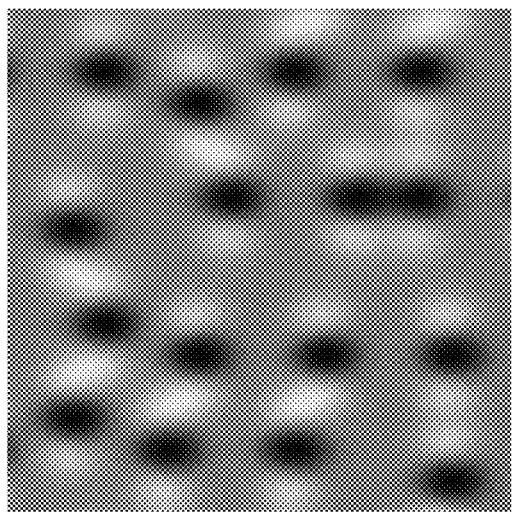
FIG. 10A is a view illustrating an example of a captured image when a low-resolution lens is used.
Figure 10B:
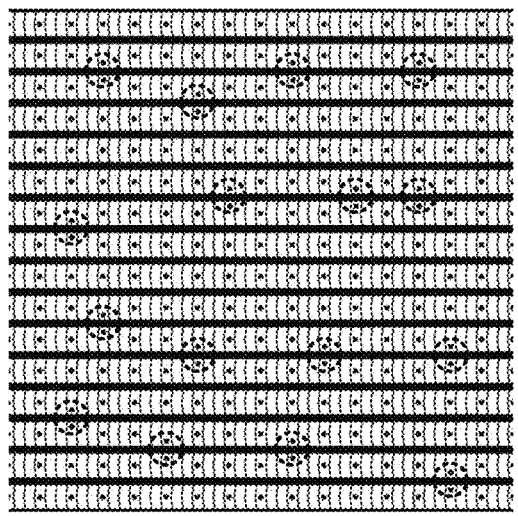
FIG. 10B illustrates dot patterns captured in FIG. 10A.

FIG. 10A illustrates another example of an image captured by using a low-resolution lens, where the dot patterns of FIG. 10B is captured. Note that, in the example of FIG. 10B, the number of dot patterns is increased for better understanding of the advantages of the low-resolution lens. In FIG. 10A, positions corresponding to pairs of dots close to each other (surrounded by broken lines) in FIG. 10B appear black, and the black matrix has been removed from the image both in the column and row directions. That is, it can be seen that the optical system in the reader 15 is set to have a low resolution, so that image recognition of only the dot patterns is possible with the black matrix having been removed.

That is, in the present embodiment, the resolution of the optical system in the reader 15 included in the pointer 10 is lower than at least one of the spatial frequency in the column direction of the black matrix or the spatial frequency in the row direction of the black matrix. For the display device 20 and the display panel 24, the black matrix is formed such that at least one of the spatial frequency in the column direction or the spatial frequency in the row direction is higher than the resolution of the optical system in the reader 15 included in the pointer 10, and the dot patterns have a spatial frequency lower than the resolution of the optical system in the reader 15.

Figure 11:
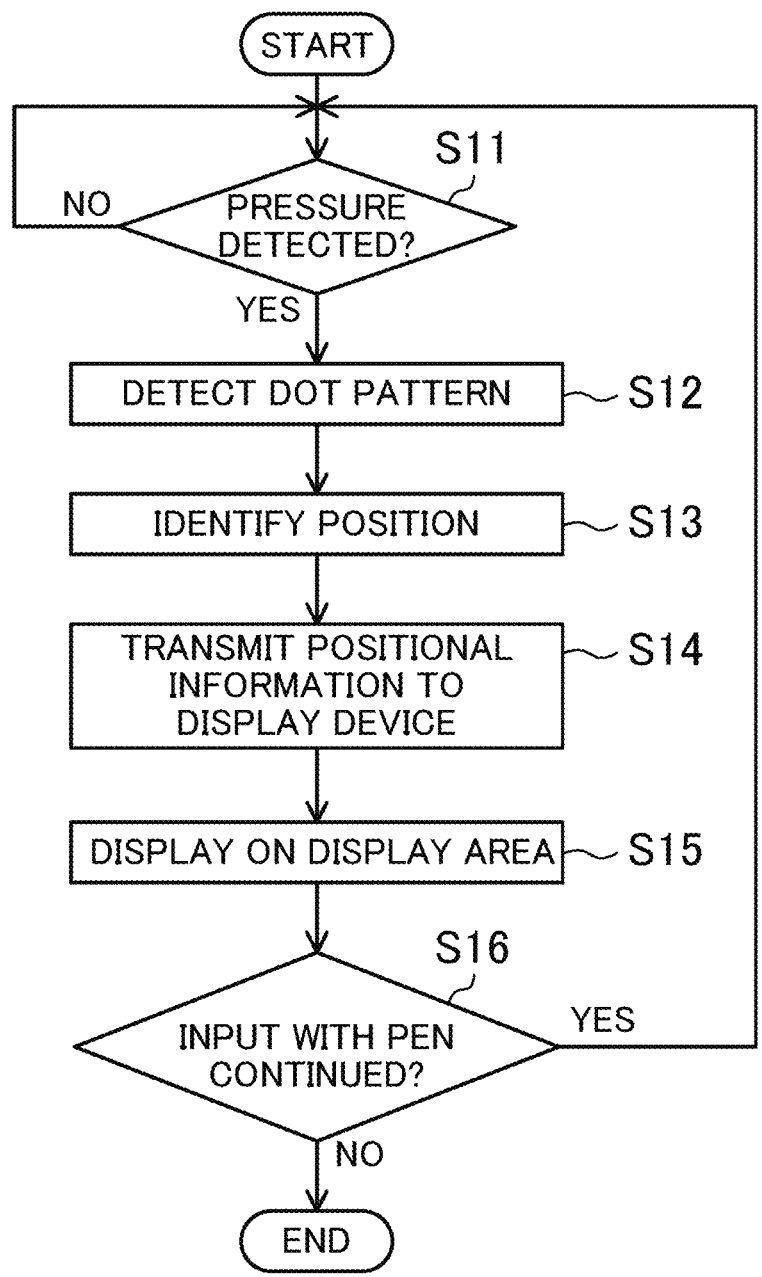
FIG. 11 is a flow chart illustrating processes in the display control system according to the embodiment.

FIG. 11 is a flow chart illustrating process flow in the display control system 100. An example where a user inputs a character to the display device 20 with a digital pen 10 will be described below.

First, when a power supply of the display control system 100 is turned on, at step S11, the pen-side microcomputer 16b of the digital pen 10 monitors whether or not pressure is applied to the nib 12. The detection of the pressure is performed by the pressure sensor 13. When the pressure is detected (Yes), the pen-side microcomputer 16b determines that the user inputs a character to the display area 21 of the display device 20, and the process proceeds to step S12. While the pressure is not detected (No), the pen-side microcomputer 16b repeats step S11. Note that when the power supply of the digital pen 10 is turned on, the irradiation section 14 starts outputting infrared light.

At step S12, the reader 15 of the digital pen 10 detects a dot pattern formed in the display area 21. From the irradiation section 14, the infrared light is output, and part of the infrared light is absorbed into the dots 33 provided in the color filter 30 of the display device 20, whereas the rest of the infrared light is reflected at the pixel regions 32, etc. The reflected infrared light enters the imaging device 15b via the objective lens 15a. As a result, the dot pattern is captured by the imaging device 15b. Here, as described above, the resolution of the objective lens 15a is lower than the spatial frequency of the black matrix, and thus the black matrix has been removed from the captured image in advance. In this way, the reader 15 optically reads the dot pattern. The image signal obtained by the reader 15 is transmitted to the identifying section 16a.

At step S13, the identifying section 16a obtains the dot pattern from the image signal, and based on the dot pattern, the identifying section 16a identifies the position of the nib 12 on the display area 21. Specifically, the identifying section 16a performs a predetermined image processing on the obtained image signal, thereby obtaining the arrangement of the plurality of dots 33. Here, since the black matrix has been removed from the captured image in advance, time required for the image processing is significantly reduced. Subsequently, the identifying section 16a determines a unit area including 6×6 dots based on the obtained arrangement of the dots 33, and identifies the position coordinate (positional information) of the unit area based on the dot pattern of the unit area. The identifying section 16a converts the dot pattern to a position coordinate by a predetermined operation corresponding to the coding method of the dot pattern. The identified positional information is transmitted to the pen-side microcomputer 16b.

Subsequently, at step S14, the pen-side microcomputer 16b transmits the positional information to the display device 20 via the transmitter 17.

The positional information transmitted from the digital pen 10 is received by the receiver 22 of the display device 20. The received positional information is transmitted from the receiver 22 to the display-side microcomputer 23. At step S15, upon receiving the positional information, the display-side microcomputer 23 controls the display panel 24 so that display contents at a position corresponding to the positional information are changed. In the example, in which a character is input, a point is displayed at the position corresponding to the positional information on the display area 21.

Subsequently, at step S16, the pen-side microcomputer 16b determines whether or not the input by the user continues. When the pressure sensor 13 detects the pressure, the pen-side microcomputer 16b determines that the input by the user continues, and the process goes back to step S11. The above-described flow is repeated, so that points are, in accordance with the movement of the nib 12 of the digital pen 10, continuously displayed at the positions of the nib 12 on the display area 21. Finally, a character according to the trace of the nib 12 of the digital pen 10 is displayed on the display surface 21 of the display device 20.

On the other hand, at step S15, when the pressure sensor 13 detects no pressure, the pen-side microcomputer 16b determines that the input by the user does not continue, and the process is terminated.

In this way, the display device 20 displays, on the display area 21, the trace of the tip of the digital pen 10 on the display area 21, thereby allowing handwriting input to the display area 21 by using the digital pen 10.

Note that although the case of inputting a character has been described above, the use of the display control system 100 is not limited to the case described above. In addition to characters, digits, symbols, drawings, etc. can, of course, be input, and it is also possible to use the digital pen 10 as an eraser to erase characters, drawings, etc. displayed in the display area 21. That is, in the example above, a point is displayed at a position corresponding to positional information on the display area 21, but the point at the position may be erased. Alternatively, the digital pen 10 can be used as a mouse to move a cursor displayed in the display area 21, or to select an icon displayed in the display area 21.

6. Advantages of Embodiment

As described above, according to the present embodiment, the resolution of the optical system in the reader 15 included in the pointer 10 is lower than at least one of the spatial frequency in the column direction of the black matrix or the spatial frequency in the row direction of the black matrix. With this configuration, it is possible to obtain a captured image from which the pattern of the black matrix has been removed in advance, so that image processing for removing the pattern of the black matrix from the captured image including a dot pattern is no longer necessary. Thus, time required for an image recognition process for identifying the position is significantly reduced, so that response to the movement of the digital pen 10 is significantly improved.

That is, in the present embodiment, on the display device 20 including the display area 21, a position in the display area 21 is indicated by the digital pen 10. The pixel regions in the display area 21 are defined by the black matrix. The reader 15 in the digital pen 10 captures an image including a dot pattern showing the plan position in the display area 21. The resolution of the optical system 15a of the reader 15 is lower than at least one of the spatial frequency in the column direction of the black matrix or the spatial frequency in the row direction of the black matrix. Thus, a captured image from which the black matrix has been removed in advance can be obtained by the reader 15. That is, when the optical system 15a of the reader 15 is set to have a low resolution, the black matrix can be removed in advance from the captured image including the dot pattern. With this configuration, performing the image processing to remove the black matrix on the captured image including the dot pattern is no longer necessary, so that time required for the image recognition process to identify the position is significantly reduced. Thus, the response to the movement of the digital pen 10 is significantly improved.

Other Embodiments

As described above, the embodiment has been described as an example technique disclosed in the present application. However, the technique according to the present disclosure is not limited to this embodiment, but is also applicable to those where modifications, substitutions, additions, and omissions are made. In addition, elements described in the embodiment may be combined to provide a different embodiment.

Thus, other embodiments will be described below.

In the embodiment, the optical digital pen has been described as an example of the pointer. Any pointer may be used as long as it is configured to point at a position on the display area of the display device, and includes: a pointing section configured to point at a position on the display area; and a reader configured to capture an image which is on the position pointed by the pointing section and includes a positional information pattern. Thus, the pointer is not limited to the optical digital pen. Moreover, the configurations of the pointing section and the reader are not limited to those described in the embodiment.

In the embodiment, as an example of the positional information pattern, the dot pattern has been described. Any positional information pattern may be used as long as it is formed in the display area of the display device, and shows the plan position in the display area. Thus, the positional information pattern is not limited to the dot pattern. Moreover, the representation of the position coordinate and the divided form of the unit areas are also not limited to those described in the embodiment.

The dots 33 may be provided in, but not limited to, the color filter 30. The dots 33 may be provided in the glass substrate 25 or the polarizing filter 26. Alternatively, the display panel 24 may include a sheet in which the dots 33 are formed in addition to the color filter 30, the glass substrate 25, and the polarizing filter 26.

Although the embodiment has described the digital pen 10 having the configuration of FIG. 4 as an example, the configuration of the digital pen 10 is not limited to that of FIG. 4. For example, the optical system in the reader may include a combination of a plurality of lenses.

The identifying section of the embodiment is provided in the digital pen 10, but the identifying section may be provided in the display device 20, or may be provided as a control device independent of the digital pen 10 and of the display device 20.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above is intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure is applicable to display control systems allowing handwriting input with quick response. Specifically, the present disclosure is applicable to tablets, smartphones, notebook PC, or the like.

What is claimed is:

1. A display control system comprising:
   a display device including a display area; and
   a pointer configured to indicate a position on the display area, wherein
   the display control system performs display control according to the position indicated by the pointer,
   the display area of the display device includes pixel regions defined by a black matrix, and a plurality of positional information patterns showing a plan position in the display area,
   the pointer includes
   a pointing section configured to indicate a position on the display area, and a reader configured to capture an image which is located at the position indicated by the pointing section and includes one or more of the plurality of positional information patterns, a resolution of an optical system in the reader is lower than at least one of a spatial frequency in a column direction of the black matrix or a spatial frequency in a row direction of the black matrix, and a spatial frequency of the plurality of positional information patterns is lower than the resolution of the optical system in the reader.

2. The display control system of claim 1, wherein the resolution of the optical system in the reader is lower than the spatial frequencies in both the column and row directions of the black matrix.

3. The display control system of claim 1, wherein each of the plurality of positional information patterns is a dot provided in a color filter of the display device.

4. A pointer configured to indicate a position in a display area which includes pixel regions defined by a black matrix and in which a plurality of positional information patterns showing a plan position is formed on a display device, the pointer comprising:

a pointing section configured to indicate a position on the display area; and a reader configured to capture an image which is located at the position indicated by the pointing section and includes one or more of the plurality of positional information patterns, wherein a resolution of an optical system in the reader is lower than at least one of a spatial frequency in a column direction of the black matrix or a spatial frequency in a row direction of the black matrix, and is higher than a spatial frequency of the plurality of positional information patterns.

5. The pointer of claim 4, wherein each of the plurality of positional information patterns is a dot provided in a color filter of the display area.

6. A display panel for use in a display control system including a display area and configured to perform display control according to a position indicated by a pointer, wherein:

the display area includes pixel regions defined by a black matrix, and a plurality of positional information patterns which show a plan position in the display area, the pointer includes
a pointing section configured to indicate a position on the display area, and
a reader configured to capture an image which is located at the position indicated by the pointing section and includes one or more of the plurality of positional information patterns, and in the display area, the black matrix is formed such that at least one of a spatial frequency in a column direction or a spatial frequency in a row direction is higher than a resolution of an optical system in the reader, and a spatial frequency of the plurality of positional information patterns is lower than the resolution of the optical system in the reader.

7. The display panel of claim 6, wherein each of the plurality of positional information patterns is a dot provided in a color filter of the display panel.

* * * * *